United States Patent [19]

Champagne et al.

[11] Patent Number: 4,529,324
[45] Date of Patent: Jul. 16, 1985

[54] SPINDLE BEARING FOLLOWER

[75] Inventors: Patrick J. Champagne, Cupertino; Robert H. Caletti, Menlo Park, both of Calif.

[73] Assignee: Sperry Corporation, New York, N.Y.

[21] Appl. No.: 466,277

[22] Filed: Feb. 14, 1983

Related U.S. Application Data

[63] Continuation of Ser. No. 200,363, Oct. 24, 1980, abandoned.

[51] Int. Cl.³ .......................................... F16C 19/08
[52] U.S. Cl. .................................................. 384/518
[58] Field of Search .......... 308/184 A, 184 R, 189 R, 308/189 A, 230, 207 R, 207 A; 384/518, 517, 563, 569

[56] References Cited

U.S. PATENT DOCUMENTS

| | | | |
|---|---|---|---|
| 3,376,084 | 4/1968 | McKee | 308/184 R |
| 3,943,803 | 3/1976 | Hafla | 308/189 A |
| 4,227,755 | 10/1980 | Lundberg | 308/184 R |

Primary Examiner—Lenard A. Footland
Attorney, Agent, or Firm—John B. Sowell; Thomas J. Scott; Marshall M. Truex

[57] ABSTRACT

This invention is a device to reduce the wobble of a rotating shaft disposed in a cavity of a housing which wobble results from a spurious or undesirable positioning of a bearing assembly in which the shaft rotates. The present device includes a bearing follower which is shaped to have a long side which is in abutment with the side walls of the cavity. Accordingly, the follower cannot be readily placed in a cocked or misaligned position. The follower is spring loaded against the bearing assembly which is subject to being cocked and thereby reduces the capability of that bearing assembly to be misaligned.

8 Claims, 4 Drawing Figures

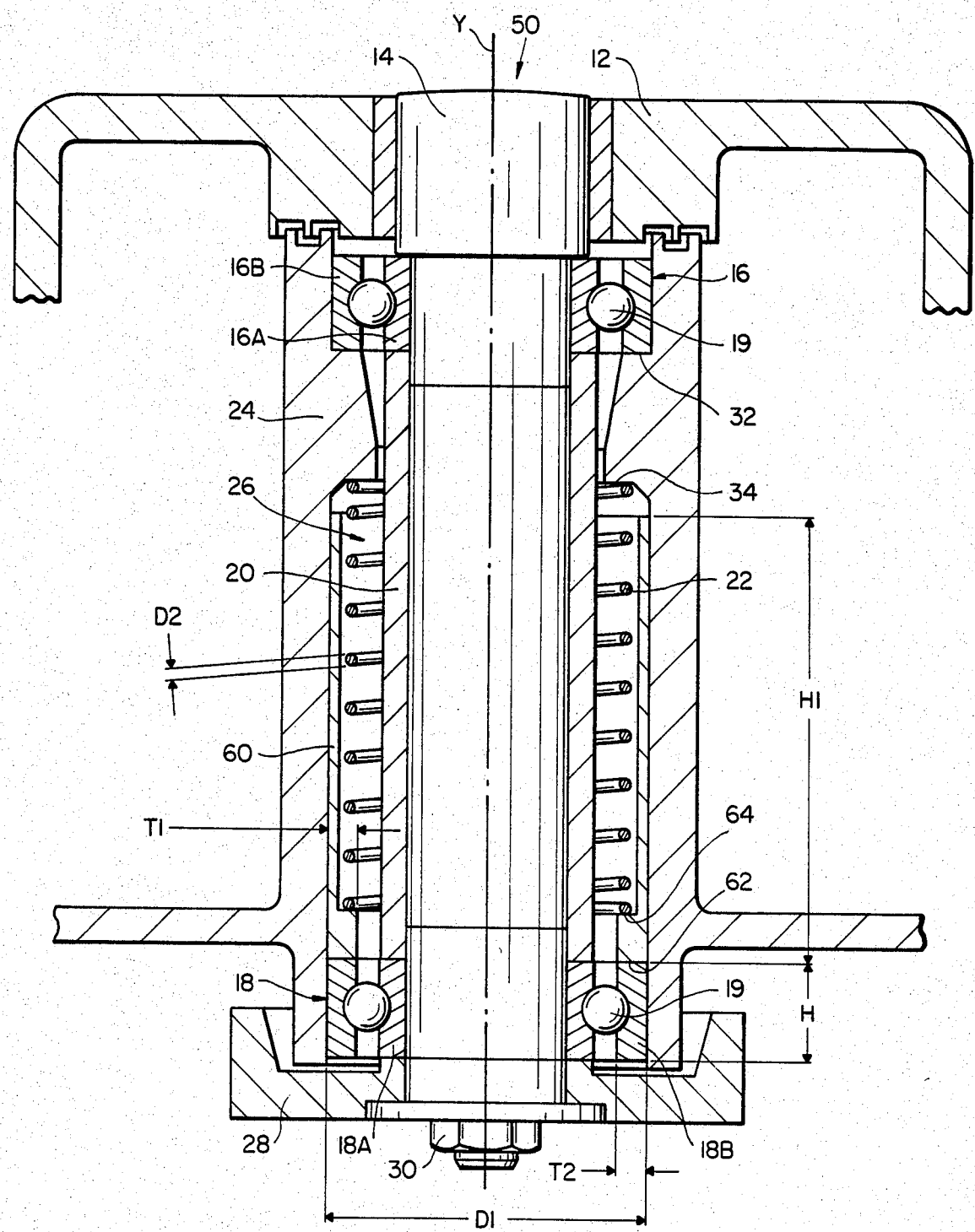
FIG_1

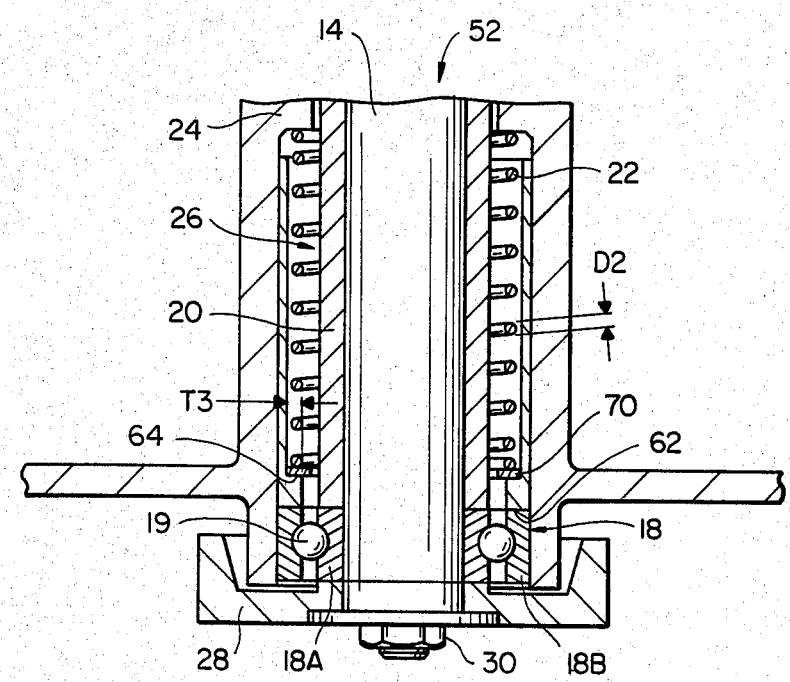
FIG_2
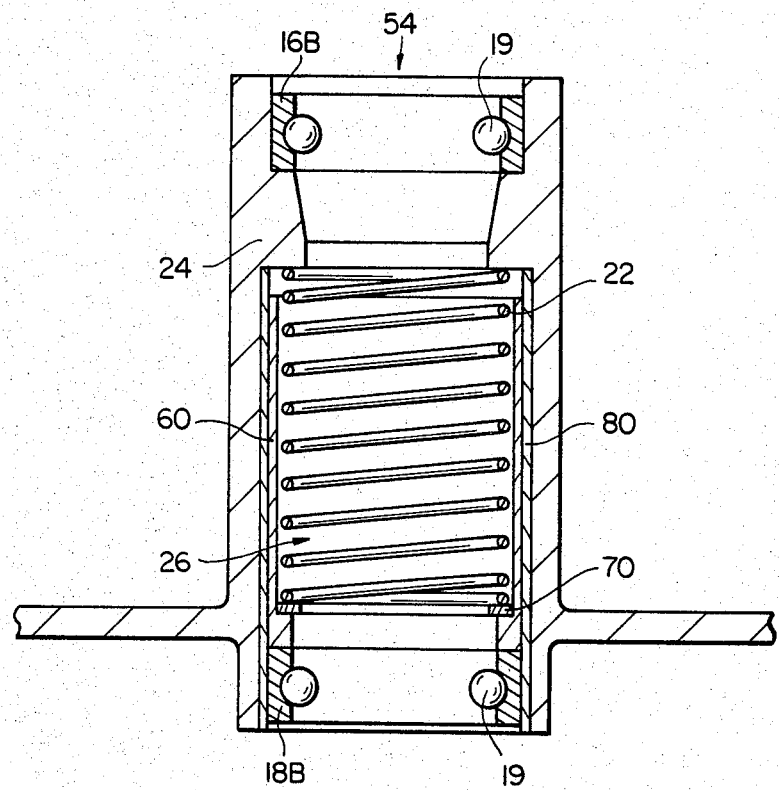
FIG_3

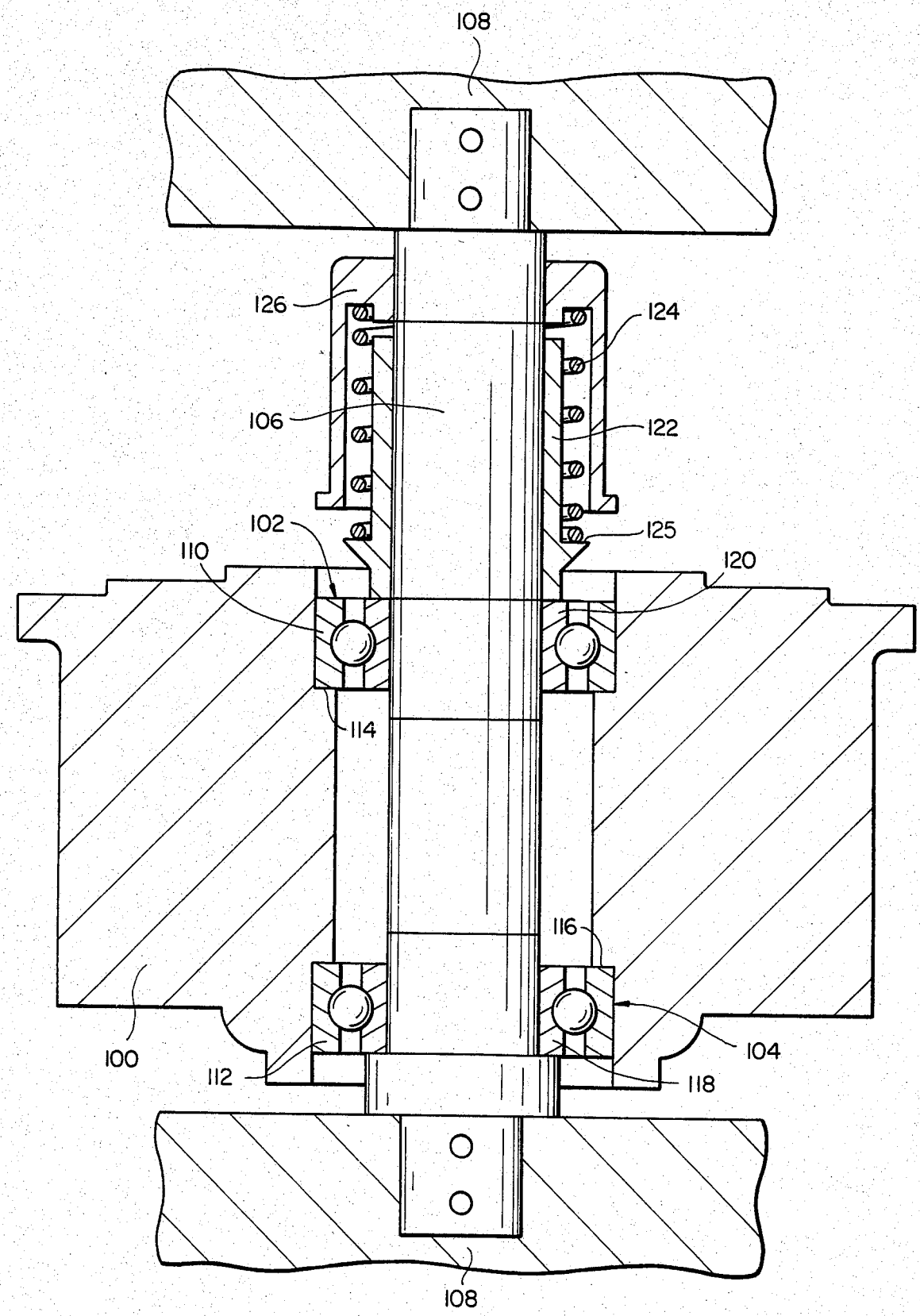
FIG_4

SPINDLE BEARING FOLLOWER

This is a continuation of application Ser. No. 220,363 filed Oct. 24, 1980, abandoned.

BACKGROUND OF THE INVENTION

1. Field of the Invention

This invention relates to apparatus for reducing the wobble in a rotating shaft and, more specifically, to an improved device for minimizing spindle wobble caused by spurious or undesirable positionings of a bearing assembly rotatably supporting the spindle.

2. Description of the Prior Art

Disk drives are widely used as peripheral memory storage systems for computers. Such systems typically include a rotating spindle upon which is mounted a hub with magnetic disks stacked thereon in a spaced array. The rotating spindle has a tendency to wobble due to manufacturing tolerances and clearances involved in making the bearing assemblies which rotatably support the spindle. Such wobble is undesirable because it limits the data storage capacity of the magnetic disks.

Prior art apparatus solved the wobble problem in great measure by spring loading a movable section of the bearing assembly so that radial forces are generated and applied to the rotating spindle thereby overcoming the tendency of the spindle to wobble. Spring loading is well known in the prior art and is also called preloading. However, spring loading of the bearing assembly has resulted very often in the undesirable positioning (cocking positioning) of the bearing assembly which in and of itself has caused the spindle to wobble.

The present invention reduces the incidence of mispositioning and thereby further aids the spring loading technique to reduce spindle wobble.

SUMMARY OF THE INVENTION

The present invention is a device used with a rotating spindle that extends through a cavity of a stationary housing. The device includes a bearing follower which is constructed with a long side that slidably abuts the side walls of the cavity. The bearing follower is spring loaded against a movable portion of a bearing assembly which rotatably supports the lower section of the spindle and which also slidably abuts the cavity side walls. Accordingly, the bearing follower transmits the spring force to the bearing assembly without causing the bearing assembly to be in a cocked position in the cavity and thereby minimizes spindle wobble due to mispositioning of the bearing assembly.

BRIEF DESCRIPTION OF THE DRAWINGS

FIG. 1 shows a cutaway and sectional elevation view of a portion of the disk drive which includes an embodiment of the present invention.

FIG. 2 depicts the lower portion of the disk drive in a cutaway and sectional view which includes another embodiment of the present invention further comprising a washer.

FIG. 3 shows a portion of the disk drive which includes still another embodiment of the present invention further comprising a sleeve. The spindle, hub, inner race elements, pulley and associated mounting means have been removed for simplicity of illustration.

FIG. 4 depicts a top sectional and cutaway view of still another embodiment of the present invention wherein a hub is rotatably supported by a stationary shaft.

DETAILED DESCRIPTION OF THE PREFERRED EMBODIMENT

In FIG. 1 a portion of the disk drive including the present invention is shown in a partially cutaway elevation view and comprises hub 12, spindle 14, bearing means 16 and 18, bearing spacer 20, coiled spring 22, spindle housing 24 having opening 26 therethrough, bearing follower 60, pulley 28, and mounting means 30. Spindle housing 24 is, typically stationary and is, typically an integral part of a baseplate (not shown) which is attached to a fixed chassis (also not shown) of the disk drive. Hub 12 is fashioned in the shape of a bell upon which magnetic recording disks (not shown) can be mounted in a vertically stacked and spaced array. Spindle 14 is press-fitted into and extends through an axial bore of hub 12. Bearing means 16 and 18 which rotatably support spindle 14 are well known in the prior art and comprise inner race elements 16A and 18A concentrically disposed within outer race elements 16B and 18B, respectively. Bearing balls 19 permit the respective inner and outer race elements to rotate relative each other. Inner race elements 16A and 18A are preferably press-fitted onto spindle 14. Outer race element 16B is bonded to the inner surface of housing 24, which inner surface defines opening 26, and is disposed against shoulder 32 which may be formed from the inner surface of housing 24. Outer race element 18B floats or is movable (while still maintaining its role of providing a race to hold the bearing balls in conjunction with race element 18A) along the side walls of opening 26 in order to effect radial forces through spring loading as is well understood in the prior art. Bearing spacer 20, preferably made of steel, is a tubular sleeve enclosing spindle 14 and functions to keep race elements 16A and 18A spaced apart at a specified distance from each other. Pulley 28, positioned against race element 18A, is rigidly attached to spindle 14 such as by mounting means 30. When a driving means (not shown) is coupled to pulley 28, a rotating spindle assembly, comprising hub 12 and the magnetic recording disk mounted thereon, spindle 14, race elements 16A and 18A, pulley 28, and mounting means 30, is made to rotate about fixed vertical axis Y. Axis Y extends through opening 26 and is coincident with the axial centerline of spindle 14.

Bearing follower 60 having a tubular configuration is disposed within opening 26 and has an aspect ratio (defined as H1/D1) substantially larger than the aspect ratio (defined as H/D1) for race element 18B. The importance of the larger aspect ratio is that bearing follower 60 cannot be significantly misaligned in opening 26 because bearing follower 60 has long side H1 in abutment with the inner surface of opening 26 and, therefore, the bearing follower is virtually prevented from becoming skewed in opening 26. It should be noted that the minimum aspect ratio for bearing follower 60 must be at least greater than the aspect ratio of race element 18B in order to be effective.

Spring 22 is disposed within opening 26 such that one end of the coiled spring presses against shoulder 34 which may be machined from the inner surface of housing 24 and the other end presses against shoulder 64 which is formed from the inner surface of bearing follower 60. End 62 of bearing follower 60 is located against race element 18B and preferably has wall thickness T1 substantially equal to thickness T2 of race element 18B. Race element 18B and bearing follower 60 slidably abut the inner surface of housing 24 and float in opening 26 so that a vertical spring force generated by spring 22 is applied on shoulder 64 and transmitted via bearing follower 60 to race element 18B. The spring force is then transmitted through bearing balls 19 to race element 18A and, thereby, produces the radial forces acting to reduce spindle wobble. Bearing follower 60 because of its large aspect ratio further minimizes any misalignment or cocking of race element 18B within opening 26 and thereby overcomes the disadvantage discussed previously for the spring loading of the bearing assembly. In other words, if the bearing follower 60 is virtually prevented from cocking as explained above and race element 18B is being pressed by follower 60, then race element 18B is virtually prevented from cocking. Moreover, the present invention has a further advantage in that the life of bearing means 16 and 18 is prolonged because premature wear produced by misalignment of race element 18B with respect to element 18A is essentially eliminated.

FIG. 2 depicts a lower portion of the disk drive which includes a second embodiment of the present invention wherein washer 70 is included. Washer 70 is positioned between shoulder 64 and coiled spring 22 and serves as a shelf means against which spring 22 presses. A shelf means is desirable for the present invention because diameter D2 of the wire used to make spring 22 is typically larger than width T3 of shoulder 64. However, since washer 70 is thin in height relative to its overall diameter, i.e., has a small aspect ratio, washer 70 does not exert any significant impact so as to function to prevent any misalignment of race element 18B when a spring force is applied.

Furthermore, it has been determined that, for a given spring loading factor which determines the force produced when the spring is compressed, the longer the spring length the less stringent are the fabrication requirements. Accordingly, in the present invention the shoulder of the bearing follower is located as close as feasible to the bottom of the bearing follower abutting the race element in order to take advantage of having a relatively long spring within the cavity.

FIG. 3 shows a portion of the disk drive which includes a third embodiment of the present invention wherein tubular sleeve 80 is further included. Hub 12, spindle 14, inner race elements 16A and 18A, pulley 28, and mounting means 30 have been removed for ease of illustration. Sleeve 80 is preferably made of steel and located within opening 26 such that it is rigidly disposed against the inner surface of spindle housing 24. Sleeve 80 is formed to provide a rigid bearing surface for bearing follower 60 preferably made of steel and race element 18B also preferably made of steel. Sleeve 80 permits spindle housing 24 typically formed integrally with the baseplate of the disk drive to be made of aluminum. Use of aluminum is less expensive than using steel throughout the spindle housing and baseplate. Moreover, aluminum is easier to machine than steel so that the shoulders and other features of the inner wall of spindle housing 24 can be finished precisely with less effort. However, aluminum will expand faster than steel when both are subjected to temperature differentials produced during disk drive operation. Therefore, steel sleeve 80 is useful to maintain the clearances of bearing follower 60 and bearing means 16 and 18 with respect to opening 26 because any thermal expansions of those steel members will be equal.

FIG. 4 depicts still another embodiment of the present invention wherein hub 100 for mounting and supporting recording disks (not shown) is rotatably supported by bearing means 102 and 104 for rotation about stationarily mounted shaft 106, which is preferably mounted horizontally with respect to stationary housing 108 (partially shown). Outer race elements 110 and 112 are secured to hub 100. Shoulders 114 and 116 are formed in hub 100 so that outer race elements 110 and 112 maintain a fixed separation from one another. Inner race element 118 is mounted to shaft 106, preferably by press-fitting the race element onto the shaft, and inner race element 120 is slidably positioned against shaft 106. Bearing follower 122 is held in abutment with inner race element 120 by one end of spring 124 acting on bearing follower shoulder 125. The other end of spring 124 is pressed against retainer 126 which can form a part of the mechanism or motor (not shown) which rotatably drives hub 100 around shaft 106 and is secured to shaft 106. Bearing follower 122 is formed to have an aspect ratio which is greater than that for inner race element 120. The above described arrangement will reduce the wobble of hub 100 as it is rotated about shaft 106 because bearing follower 122 serves to reduce substantially the spurious positioning of inner race element 120 with respect to outer race element 110 in a manner which is equivalent to that discussed previously for bearing follower 60. It should be noted that the principal difference between the embodiment depicted in FIG. 4 and the embodiments shown in the prior figures involves the method of applying the preloading force to the bearing means. As further explanation, FIG. 4 shows the preloading force being applied to the inner race element which is slidably movable while the other figures each shows the preloading force being applied to the outer race element which is slidably movable. However, in all embodiments of the present invention a bearing follower at large aspect ratio is used to reduce the spurious positions of the slidably movable race element of the bearing means and thereby reduces the wobble of the rotating member.

While the invention has been shown in various embodiments, it will be understood by those skilled in the art that various changes in form and detail may be made without departing from the spirit and scope of the invention as recited in the following claims.

Having described my invention, what is claimed is:

1. A device to reduce the wobble of a rotating member (14) with respect to a fixed axis of stationary housing means (24), comprising abutment (34) formed in said stationary housing means to provide a reference point for a spring means, bearing assembly means (18) including fixed (18A) and movable (18B) race elements for rotatably supporting said rotating member, at least one of said race elements, (18A, 18B) secured to said rotating member, said movable race element (18B) having a length dimension and disposed to be movable along a direction parallel to said fixed axis, bearing contact means (60) formed to have a shoulder portion (64) adjacent one end thereof and slidably positioned to be movable along said direction parallel to said fixed axis, said bearing contact means having a length dimension which is longer than said length dimension of said movable race element, spring means (22) disposed to encompass said rotating member (14) within said bearing contact means such that one end thereof abuts said abutment means (34) and the other end thereof exerts a force against said shoulder (64) portion of said bearing contact means (60) whereby said one end of said bearing contact means is placed in abutment with said movable race element of said bearing assembly means and thereby properly positions said movable race element and minimizes any wobble or mispositioning of said rotating member resulting from spurious positions of said movable race element, and or mispositioning of said rotating member resulting from spurious positions of said movable race element, and washer means disposed on said shoulder portion of said bearing contact means for providing shelf means for said other end of said spring means.

2. The device of claim 1, further including cylindrical means secured to said housing means and formed for providing a bearing surface in abutment with said bearing contact means and said movable race element of said bearing assembly means.

3. The apparatus recited in claim 1 wherein, said spring means is of substantially the same length as said bearing contact means.

4. The device recited in claim 1 wherein, said bearing contact means slides against a portion of said housing means.

5. The device recited in claim 1 including, further bearing assembly means for rotatably supporting said rotating member in said housing means.

6. The device recited in claim 5 wherein, said further bearing assembly means is disposed away from said bearing contact means.

7. The device recited in claim 1 including, hub means connected to one end of said rotating member and rotatable therewith.

8. The device recited in claim 1 wherein, said bearing contact means and said movable race element have substantially identical diameter dimensions.

* * * * *